United States Patent
Kawamura

(10) Patent No.: US 12,456,195 B2
(45) Date of Patent: Oct. 28, 2025

(54) RADIOGRAPHIC IMAGE PROCESSING DEVICE AND NON-TRANSITORY COMPUTER READABLE MEDIUM

(71) Applicant: FUJIFILM Corporation, Tokyo (JP)

(72) Inventor: Takahiro Kawamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 537 days.

(21) Appl. No.: 17/406,706

(22) Filed: Aug. 19, 2021

(65) Prior Publication Data

US 2021/0383543 A1   Dec. 9, 2021

Related U.S. Application Data

(63) Continuation of application No. PCT/JP2020/006825, filed on Feb. 20, 2020.

(30) Foreign Application Priority Data

Feb. 28, 2019   (JP) ................................ 2019-036590

(51) Int. Cl.
*G06T 7/00*   (2017.01)
*A61B 6/00*   (2024.01)
*G06T 7/90*   (2017.01)

(52) U.S. Cl.
CPC .......... *G06T 7/0014* (2013.01); *A61B 6/5282* (2013.01); *G06T 7/00* (2013.01); *G06T 7/90* (2017.01); *G06V 2201/03* (2022.01)

(58) Field of Classification Search
CPC .............. G06T 7/0014; G06T 5/94; G06T 2207/10116; A61B 6/5282; A61B 6/5211;

(Continued)

(56) References Cited

U.S. PATENT DOCUMENTS

2008/0232667 A1   9/2008   Kitamura et al.
2008/0232668 A1   9/2008   Kitamura et al.
(Continued)

FOREIGN PATENT DOCUMENTS

EP   2 548 510 A1   1/2013
JP   H03-041933 A   2/1991
(Continued)

OTHER PUBLICATIONS

An Office Action; "Notice of Reasons for Refusal," mailed by the Japanese Patent Office on Apr. 12, 2022, which corresponds to Japanese Patent Application No. 2021-502141 and is related to U.S. Appl. No. 17/406,706 with English language translation.
(Continued)

*Primary Examiner* — Matthew C Bella
*Assistant Examiner* — Andrew B. Jones
(74) *Attorney, Agent, or Firm* — Studebaker Brackett PLLC

(57) ABSTRACT

A radiographic image processing device includes a radiographic image acquisition unit that acquires a plurality of radiographic images of a specific subject taken using radiations having energies different from each other, a structure recognition unit that recognizes structures, which is included in the subject, using the radiographic images, an attenuation coefficient calculation unit that calculates attenuation coefficients μ of the radiation for the structures, which are recognized by the structure recognition unit, using recognition results of the structure recognition unit and the plurality of radiographic images, and an image processing unit that performs image processing on the radiographic images using the attenuation coefficients.

14 Claims, 12 Drawing Sheets

(58) Field of Classification Search
CPC ... A61B 6/482; G06V 2201/03; G06V 10/803
See application file for complete search history.

(56) References Cited

U.S. PATENT DOCUMENTS

| | | | |
|---|---|---|---|
| 2009/0226060 A1* | 9/2009 | Gering | G06T 7/174 |
| | | | 382/128 |
| 2010/0067772 A1 | 3/2010 | Kitamura | |
| 2013/0022170 A1 | 1/2013 | Cho | |
| 2013/0051648 A1 | 2/2013 | Kim et al. | |
| 2013/0101089 A1 | 4/2013 | Cho | |
| 2013/0108137 A1* | 5/2013 | Kitamura | G06T 7/0012 |
| | | | 382/132 |
| 2014/0064444 A1* | 3/2014 | Oh | G16H 50/30 |
| | | | 378/54 |
| 2015/0164456 A1 | 6/2015 | Takamatsu et al. | |
| 2017/0116730 A1* | 4/2017 | Yamanaka | G06T 5/94 |
| 2018/0182102 A1* | 6/2018 | Jerebko | G06T 7/11 |
| 2018/0240224 A1 | 8/2018 | Fukuda | |
| 2019/0162679 A1 | 5/2019 | Yamakawa et al. | |

FOREIGN PATENT DOCUMENTS

| | | | | |
|---|---|---|---|---|
| JP | H05-161631 A | | 6/1993 | |
| JP | 2003-224775 A | | 8/2003 | |
| JP | 2008167949 A | * | 7/2008 | ............. A61B 6/482 |
| JP | 2008-229161 A | | 10/2008 | |
| JP | 2010-005252 A | | 1/2010 | |
| JP | 2010-187991 A | | 9/2010 | |
| JP | 2012-192118 A | | 10/2012 | |
| JP | 2013-052243 A | | 3/2013 | |
| JP | 2013-085967 A | | 5/2013 | |
| JP | 2014-050708 A | | 3/2014 | |
| JP | 2014-061274 A | | 4/2014 | |
| JP | 2018-134205 A | | 8/2018 | |
| WO | 2016/038667 A1 | | 3/2016 | |
| WO | 2018/212217 A1 | | 11/2018 | |

OTHER PUBLICATIONS

An Office Action; "Notice of Reasons for Refusal," mailed by the Japanese Patent Office on May 23, 2023, which corresponds to Japanese Patent Application No. 2022-104249 and is related to U.S. Appl. No. 17/406,706; with English language translation.
International Search Report issued in PCT/JP2020/006825; mailed May 19, 2020.
International Preliminary Report On Patentability and Written Opinion issued in PCT/JP2020/006825; issued Aug. 25, 2021.
The extended European search report issued by the European Patent Office on Mar. 10, 2022, which corresponds to European Patent Application No. 20763883.4-1126 and is related to U.S. Appl. No. 17/406,706.
Communication pursuant to Article 94(3) EPC issued by the European Patent Office on Aug. 2, 2024, which Corresponds to European Patent Application No. 20763883.4-1122 and is related to U.S. Appl. No. 17/406,706.

* cited by examiner

RADIOGRAPHIC IMAGE PROCESSING DEVICE AND NON-TRANSITORY COMPUTER READABLE MEDIUM

CROSS-REFERENCE TO RELATED APPLICATIONS

This application is a Continuation of PCT International Application No. PCT/JP2020/006825 filed on 20 Feb. 2020, which claims priority under 35 U.S.C § 119(a) to Japanese Patent Application No. 2019-036590 filed on 28 Feb. 2019. The above application is hereby expressly incorporated by reference, in its entirety, into the present application.

BACKGROUND OF THE INVENTION

1. Field of the Invention

The present invention relates to a radiographic image processing device and a non-transitory computer readable medium that perform image processing on a radiographic image.

2. Description of the Related Art

A radiographic imaging device imaging a subject using radiation, such as an X-ray, has been spread in the past. For example, in a case where a subject is a human or an animal, radiographic images are used for the diagnosis or the like of a lesion. In recent years, radiographic images used for diagnosis and the like are not limited to so-called projection images, and there is a case where a soft part image where soft part tissues of a subject are extracted (or emphasized) and/or a bony part image where a bony part of a subject is extracted are used. The soft part image and/or the bony part image are generated by so-called subtraction processing. The subtraction processing is processing for giving predetermined weight to two types of radiographic images, which are taken using radiations having energies and the like different from each other, and calculating a difference between the radiographic images; and is processing using an attenuation coefficient of the radiation that varies depending on each composition. For example, a mammography device for decomposing a breast, which is a subject, for each composition by using a difference in the attenuation coefficient of an X-ray determined for each composition is known (JP2014-050708A, corresponding to US2014/064444A1).

SUMMARY OF THE INVENTION

The reason why a soft part image and/or a bony part image, which can be used for a diagnosis and the like, can be generated by so-called subtraction processing is that the attenuation coefficients of a soft part and/or a bony part are already known by experiments and the like and a difference between the attenuation coefficients is large to such an extent that a difference depending on a subject does not matter.

Incidentally, tissues and the like collectively referred to as the "soft part" in the subtraction processing naturally include a plurality of tissues and the like. For example, there are a lesion and the like where the lungs, the heart, the fat, the muscle, or a part of tissues of these are abnormally formed. These soft part tissues usually have a small difference in attenuation coefficient and also have a difference in volume and the like for each subject. For this reason, it is difficult to specify each of these in subtraction processing in the related art and to obtain images in which an emphasis or the like is individually put on these.

An object of the invention is to provide a radiographic image processing device and a non-transitory computer readable medium that individually specify structures included in a subject in a radiographic image.

A radiographic image processing device according to an aspect of the invention comprises: a radiographic image acquisition unit that acquires a plurality of radiographic images of a specific subject taken using radiations having energies different from each other; a structure recognition unit that recognizes structures, which is included in the subject, using one or a plurality of the radiographic images; an attenuation coefficient calculation unit that calculates attenuation coefficients of the radiation for one or a plurality of the structures, which are recognized by the structure recognition unit, using recognition results of the structure recognition unit and the plurality of radiographic images; and an image processing unit that performs image processing on one or a plurality of the radiographic images among the plurality of radiographic images using the attenuation coefficients.

It is preferable that the structure recognition unit relatively determines the structures to be recognized from the subject.

It is preferable that the structure recognition unit recognizes positions, sizes, or shapes of the structures of the subject.

It is preferable that the attenuation coefficient calculation unit calculates the attenuation coefficients using ratios or differences between pixel values of corresponding pixels of two or more radiographic images.

It is preferable that the structure recognition unit recognizes three or more structures using two radiographic images, and the attenuation coefficient calculation unit calculates the attenuation coefficients of the three or more structures, which are recognized by the structure recognition unit, using the two radiographic images used in recognition processing by the structure recognition unit.

It is preferable that the radiographic image processing device further comprises a composition amount calculation unit for calculating an amount of composition of each of the structures using the recognition results of the structure recognition unit and the attenuation coefficients.

It is preferable that the image processing unit generates an emphasized image in which one or a plurality of the structures among the plurality of structures recognized by the structure recognition unit are emphasized.

It is preferable that the image processing unit generates the emphasized image by subtraction processing.

It is preferable that the image processing unit generates the emphasized image in which a color or density of at least one of the structures is modulated.

It is preferable that the image processing unit generates a composition amount image having a color or density corresponding to the amount of composition of the structure.

According to another aspect of the invention, a non-transitory computer readable medium for storing a computer-executable program causes a computer to recognize a structure included in a specific subject using a learned model that specifies one or a plurality of structures, which are included in the subject, in a plurality of radiographic images, which are taken from the subject using radiations having energies different from each other, by an input of the plurality of radiographic images.

According to still another aspect of the invention, a non-transitory computer readable medium for storing a computer-executable program causes a computer to classify a structure included in a specific subject using a learned model that specifies one or a plurality of structures, which are included in the subject, and attenuation coefficients of the structures in a plurality of radiographic images, which are taken from the subject using radiations having energies different from each other, by an input of the plurality of radiographic images.

According to the radiographic image processing device and the non-transitory computer readable medium of aspects of the invention, it is possible to individually specify structures included in a subject in a radiographic image.

DESCRIPTION OF THE PREFERRED EMBODIMENTS

First Embodiment

Figure 1:
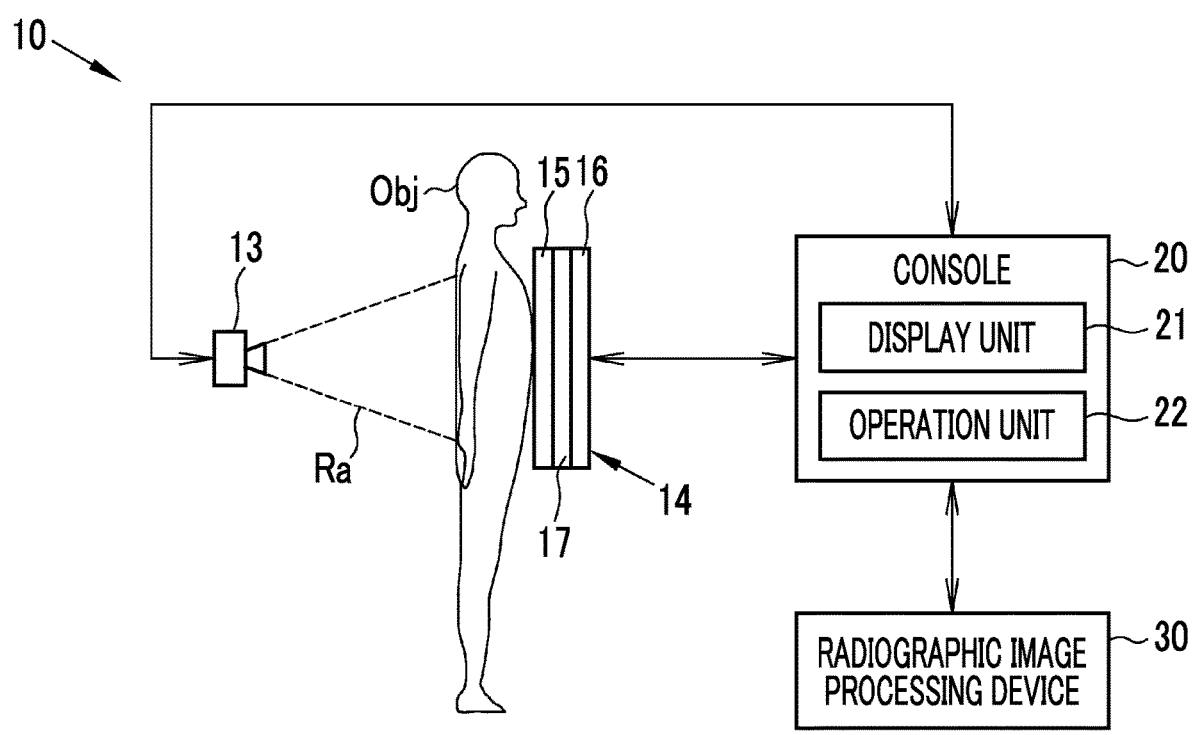
FIG. 1 is a diagram illustrating the configuration of a radiographic imaging device.

As shown in FIG. 1, a radiographic imaging system 10 comprises a radiation source 13, a radiographic imaging panel 14, a console 20, and a radiographic image processing device 30. The radiation source 13, the radiographic imaging panel 14, and the console 20 form a radiographic imaging device.

The radiation source 13 is a device generating radiation Ra required for imaging, and consists of a radiation tube that generates the radiation Ra, a high voltage generating circuit that generates a high voltage required to allow the radiation tube to generate the radiation Ra, and the like. The radiation source 13 can generate a plurality of types of radiations having different qualities (energy distributions (hereinafter, simply referred to as energy)) by adjusting the tube voltage, the tube current and the like of the radiation tube. The energy of the radiation generated by the radiation source 13 is one of imaging conditions. In this embodiment, the radiation source 13 is an X-ray source generating an X-ray. For this reason, the radiographic imaging system 10 is an X-ray imaging system that acquires the X-ray image of a subject Obj by imaging the subject Obj using an X-ray. The subject Obj is, for example, a human, and the chest of the subject Obj is imaged in this embodiment.

The radiographic imaging panel 14 images the subject Obj using the radiation Ra generated by the radiation source 13. That is, the radiographic imaging panel 14 is a so-called flat panel detector (FPD), and outputs the radiographic image of the subject Obj by detecting the radiation Ra, which is transmitted through the subject Obj, and converting the radiation Ra into electrical signals. In the imaging using the radiographic imaging panel 14, a grid (not shown) can be used together as necessary. The grid is a device for removing scattered radiation components of radiation, and is, for example, a stationary Lysholm grid, a movable Bucky's grid, or the like.

In this embodiment, the radiographic imaging panel 14 comprises two detectors, that is, a first radiation detector 15 and a second radiation detector 16. One detector, which is disposed to be closer to the subject Obj and the radiation source 13, of the first and second radiation detectors 15 and 16 is the first radiation detector 15, and the other detector thereof, which is disposed to be farther from the subject Obj and the radiation source 13, is the second radiation detector 16. The first and second radiation detectors 15 and 16 detect the radiation Ra, which is transmitted through the subject Obj, for each pixel. Further, each of the first and second radiation detectors 15 and 16 outputs the radiographic image of the subject Obj. Further, the radiographic imaging panel 14 comprises a radiation energy conversion filter 17 between the first and second radiation detectors 15 and 16. The radiation energy conversion filter 17 is, for example, a copper plate or the like, and absorbs the low-energy components of the radiation Ra. For this reason, the energy of the radiation Ra is changed until the radiation Ra reaches the second radiation detector 16 after being transmitted through the first radiation detector 15. Accordingly, the radiographic imaging panel 14 simultaneously images the specific subject Obj under the same imaging conditions (with the same radiation Ra), but a first radiographic image G1 (see FIG. 6) output from the first radiation detector 15 and a second radiographic image G2 (see FIG. 7) output from the second radiation detector 16 are radiographic images that are taken using radiation Ra having energies substantially different from each other.

Each of the first and second radiation detectors 15 and 16 is any one of an indirect conversion type detector or a direct conversion type detector, or different types of detectors may be employed as the first and second radiation detectors 15 and 16. The indirect conversion type detector is a detector that converts the radiation Ra into visible light using a scintillator consisting of cesium iodide (CsI) or the like and photoelectrically converts the visible light into electrical signals to indirectly obtain electrical signals. The direct conversion type detector is a detector that directly converts the radiation Ra into electrical signals using a scintillator consisting of amorphous selenium or the like. Further, each of the first and second radiation detectors 15 and 16 may be a penetration side sampling (PSS) detector or may be an irradiation side sampling (ISS) detector. A PSS system is a system in which a scintillator is disposed on a side, which faces the subject Obj, of a thin film transistor (TFT) that reads out electrical signals. An ISS system is a system in which a TFT and a scintillator are arranged in this order from the subject Obj on the contrary to the PSS system.

The console 20 is a control device (computer) for controlling the operations of the radiation source 13 and the radiographic imaging panel 14, and comprises a display unit 21, an operation unit 22, and the like. The display unit 21 is, for example, a liquid crystal display or the like, and displays necessary items according to operations, settings, or the like in addition to taken radiographic images. The operation unit 22 is, for example, a keyboard and/or a pointing device, or the like that are used for the setting input of imaging conditions and the like and the operations of the radiation source 13 and the radiographic imaging panel 14. The display unit 21 and the operation unit 22 can be formed of touch panels.

The radiographic image processing device 30 performs image processing using radiographic images of the subject Obj for display in a diagnosis and the like or for detailed image analysis according to a diagnosis and the like. The radiographic image processing device 30 is directly connected to the console 20, and can acquire the radiographic images of the subject Obj in real time and use the radiographic images in image processing. Further, the radiographic image processing device 30 can indirectly acquire radiographic images through radiology information systems (RIS), hospital information systems (HIS), picture archiving and communication systems (PACS), a digital imaging and communications in medicine (DICOM) server included in PACS, or the like instead of being directly connected to the console 20 and use the radiographic images in the image processing.

Figure 2:
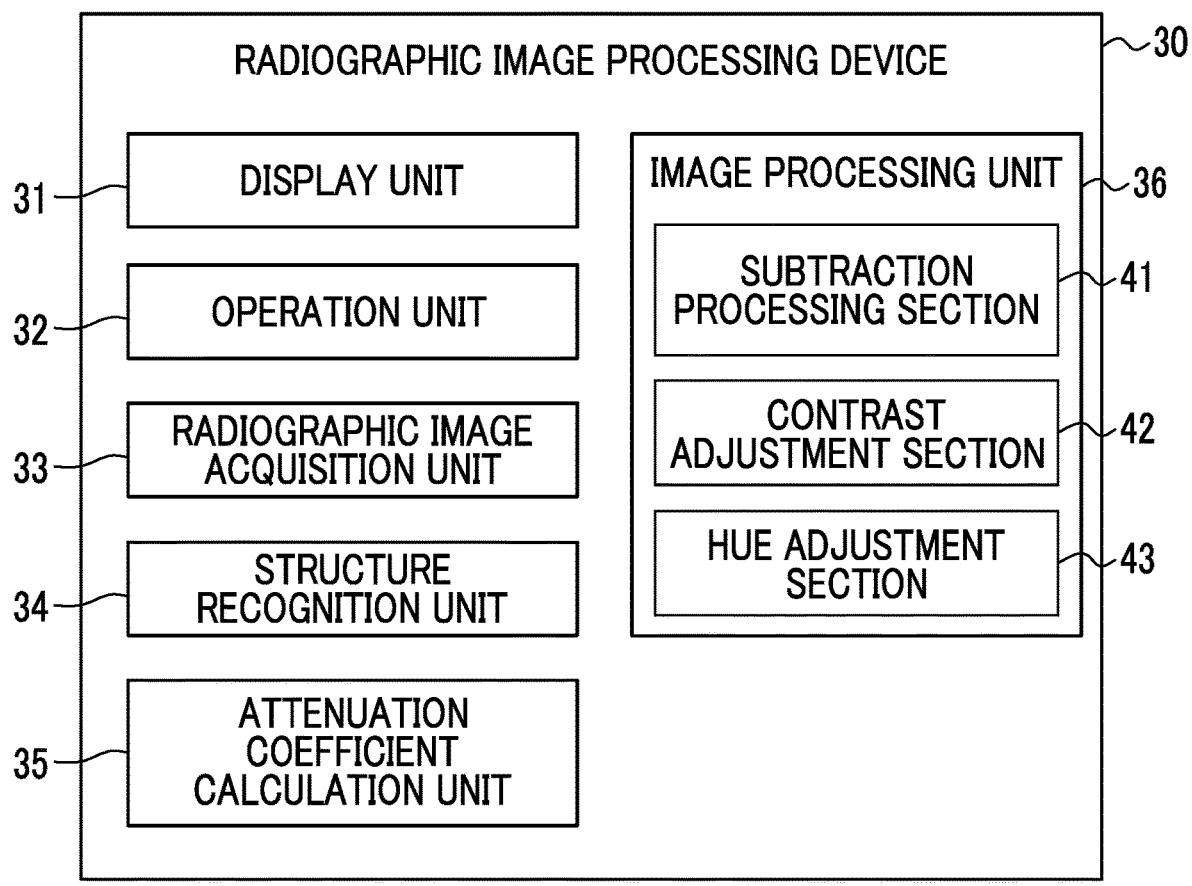
FIG. 2 is a block diagram showing the configuration of a radiographic image processing device.

As shown in FIG. 2, the radiographic image processing device 30 is a so-called computer and comprises a display unit 31, an operation unit 32, a radiographic image acquisition unit 33, a structure recognition unit 34, an attenuation coefficient calculation unit 35, an image processing unit 36, and the like.

The display unit 31 is a liquid crystal display or the like, and displays the taken radiographic images, images generated by the radiographic image processing device 30, and the like. The operation unit 32 is a keyboard and/or a pointing device, and the like that are used to operate the radiographic image processing device 30. Each of the display unit 31 and the operation unit 32 can be formed of a touch panel. The radiographic image processing device 30 is a device separate from the console 20 in this embodiment, but a part of the radiographic image processing device 30 or the entire radiographic image processing device 30 can be provided in the console 20. In this case, the display unit 21 and/or operation unit 22 of the console 20 can be used as the display unit 31 and/or the operation unit 32 of the radiographic image processing device 30. Further, the console 20 forms the radiographic image processing device 30 in a case where the entire radiographic image processing device 30 is provided in the console 20.

The radiographic image acquisition unit 33 acquires a plurality of radiographic images of a specific subject Obj that are taken using radiations having energies different from each other. "Specific subject Obj" means that the subject Obj is a specific human or object. Further, "acquires a plurality of radiographic images of the specific subject Obj" means that the subject Obj is the same and a plurality of radiographic images to which an imaged part of the subject Obj (imaged portion) and an imaging direction are common are acquired. "Taken using radiations having energies different from each other" means that the quality of the radiation Ra is substantially different in the case of the formation of radiographic images (the detection of the radiation Ra), and includes a case where a radiographic image is formed using radiation Ra of which the quality is changed through the radiation energy conversion filter 17 or the like in addition to a case where the quality of the radiation Ra emitted from the radiation source 13 is different. That is, for example, in a case where radiographic imaging is performed using an FPD that comprises one radiation detector, the radiographic image acquisition unit 33 acquires a plurality of radiographic images by imaging the specific subject Obj a plurality of times while changing the quality of the radiation Ra. Further, for example, in a case where radiographic imaging is performed using an FPD that comprises a plurality of radiation detectors with the radiation energy conversion filter 17 or the like therebetween, the radiographic image acquisition unit 33 acquires respective radiographic images output from these respective radiation detectors. In this embodiment, the radiographic image acquisition unit 33 acquires the first radiographic image G1 output from the first radiation detector 15 and the second radiographic image G2 output from the second radiation detector 16. In a case where the radiographic image acquisition unit 33 acquires the plurality of radiographic images described above, the radiographic image acquisition unit 33 may acquire not only so-called original images (images not subjected to image processing and the like) but also radiographic images subjected to various types of processing, such as scattered radiation correction processing or other image processing. Furthermore, one, a plurality of, or all of the plurality of radiographic images to be acquired by the radiographic image acquisition unit 33 can be radiographic images subjected to the scattered radiation correction processing and the like. The scattered radiation correction processing is image processing that reduces and corrects the scattered radiation of the radiation Ra caused by the subject Obj and the like.

The structure recognition unit 34 recognizes structures, which are included in the subject Obj, using one or a plurality of the radiographic images. The structures included in the subject Obj mean the units of tissues and the like, which can be distinguished from other tissues and the like, among the tissues (substances) and the like forming the subject Obj. "Can be distinguished" means that a boundary can be identified or estimated. For example, in a case where the subject Obj is a human (patient), and the chest of the human is an object to be imaged, each of dysplastic portions (lesions, portions suspected as lesions, or the like) of some or all of other bones, such as the ribs, the heart, the lungs, the fat, the muscles, and the like or artifacts embedded in the subject Obj is a structure that is to be recognized by the structure recognition unit 34. Other bones, such as the ribs, are a so-called bony part (bony part tissues), and the heart, the lungs, the fat, and the muscle, and the like are a so-called soft part (soft part tissues). That is, the structure recognition unit 34 recognizes the bony part and the soft part as results, respectively, and can also distinguish and recognize the respective tissues and the like forming the soft part. The same applies to a case where the subject Obj is an object or a case where an imaged part of the subject Obj is a portion other than the chest.

The structure recognition unit 34 can randomly select one or a plurality of the radiographic images among the plurality of radiographic images of the specific subject Obj that are acquired by the radiographic image acquisition unit 33, and can use the selected radiographic images in recognition processing. The structure recognition unit 34 uses the first radiographic image G1 to recognize structures in this embodiment, but can use the second radiographic image G2 instead of the first radiographic image G1 or in addition to the first radiographic image G1. The structure recognition unit 34 can perform the recognition processing using a radiographic image subjected to the scattered radiation correction processing and the like. For example, in a case where the radiographic image acquisition unit 33 acquires radiographic images subjected to the scattered radiation correction processing and the like, the structure recognition unit 34 can use the radiographic images in the recognition processing. Further, in a case where the radiographic image processing device 30 performs the scattered radiation correction processing and the like even in a case where the radiographic image acquisition unit 33 acquires radiographic images not subjected to the scattered radiation correction processing and the like, the structure recognition unit 34 can perform the recognition processing using radiographic images subjected to the scattered radiation correction processing and the like instead of the radiographic images, which are acquired by the radiographic image acquisition unit 33 and are not subjected to the scattered radiation correction processing and the like, or together with the radiographic images not subjected to the scattered radiation correction processing and the like. The radiographic image processing device 30 can perform various types of processing, such as the scattered radiation correction processing, on the radiographic image by the image processing unit 36.

The structure recognition unit 34 relatively determines structures to be recognized from the subject Obj captured in the radiographic image. That is, the structure recognition unit 34 recognizes portions, which can be relatively distinguished in the subject Obj, as the "structures" without determining an object to be recognized in advance. For example, in the case of the chest of a human body, the structure recognition unit 34 recognizes portions showing the bony part, the heart, the lungs, and other tissues as the results of the recognition of structures without recognizing the bony part and the soft part in advance.

The structure recognition unit 34 recognizes at least the positions, sizes, shapes and/or the like of the structures of the subject Obj captured in the radiographic images. That is, the recognition processing performed by the structure recognition unit 34 is processing for specifying the positions, sizes, shapes and/or the like of the structures having boundaries with other tissues and the like in the subject Obj captured in the radiographic images. Accordingly, it is optional whether or not the structure recognition unit 34 will recognize the compositions of the recognized structures (the types of the tissues of the recognized structures). In a case where the structure recognition unit 34 recognizes the compositions of the recognized structures, the structure recognition unit 34 recognizes the compositions of the recognized structures using the positions, sizes, shapes and/or the like of the recognized structures. For example, since the positions, sizes, shapes, and the like of the lungs have been generally determined in the chest of a human body, the structure recognition unit 34 can specify (recognize) that specific structures of the recognized structures are the lungs. In this embodiment, the structure recognition unit 34 does not specify the composition of a structure of the subject Obj. However, for convenience of description, the structure recognized by the structure recognition unit 34 is represented by a name, such as the bony part, the lungs, or the heart, representing the composition thereof.

The attenuation coefficient calculation unit 35 calculates the attenuation coefficients $\mu$ of the radiation Ra for one or a plurality of the structures, which are recognized by the structure recognition unit 34, using the recognition results of the structure recognition unit 34 and the plurality of radiographic images. The attenuation coefficients $\mu$, which are calculated by the attenuation coefficient calculation unit 35, are so-called radiation source-attenuation coefficients and mean the degree (rate) of attenuation of the radiation Ra that is caused by absorption, scattering, or the like. The attenuation coefficient $\mu$ varies depending on the specific composition (a density or the like) and thickness (mass) of the structure through which the radiation Ra is transmitted.

Figure 3:
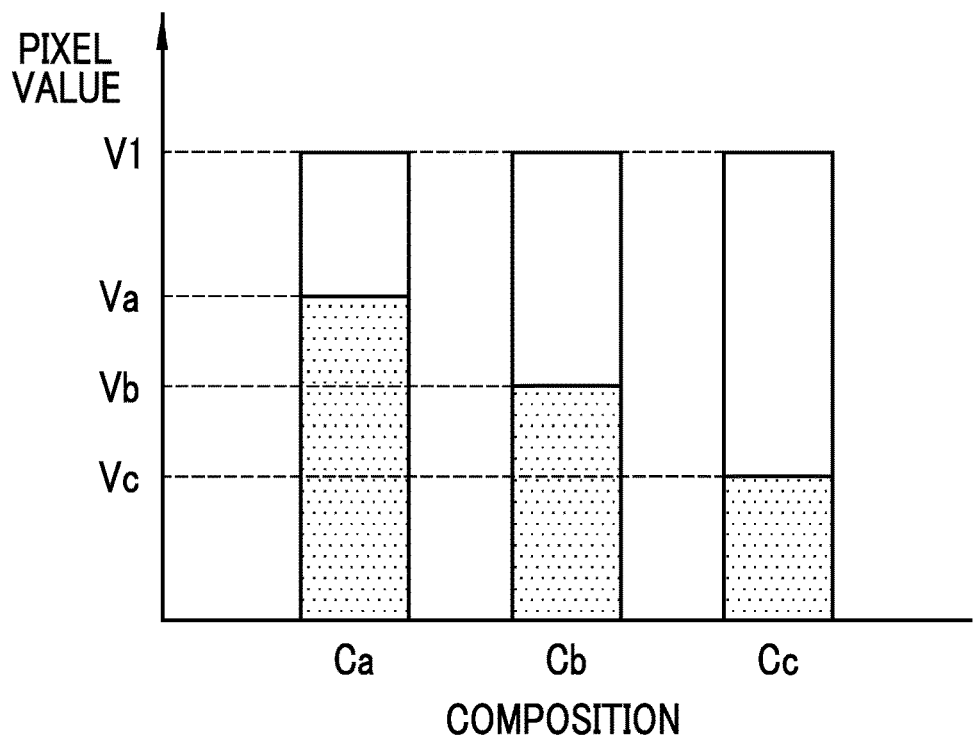
FIG. 3 is a graph showing a difference in the pixel values of a radiographic image that is caused by a difference in composition.
Figure 4:
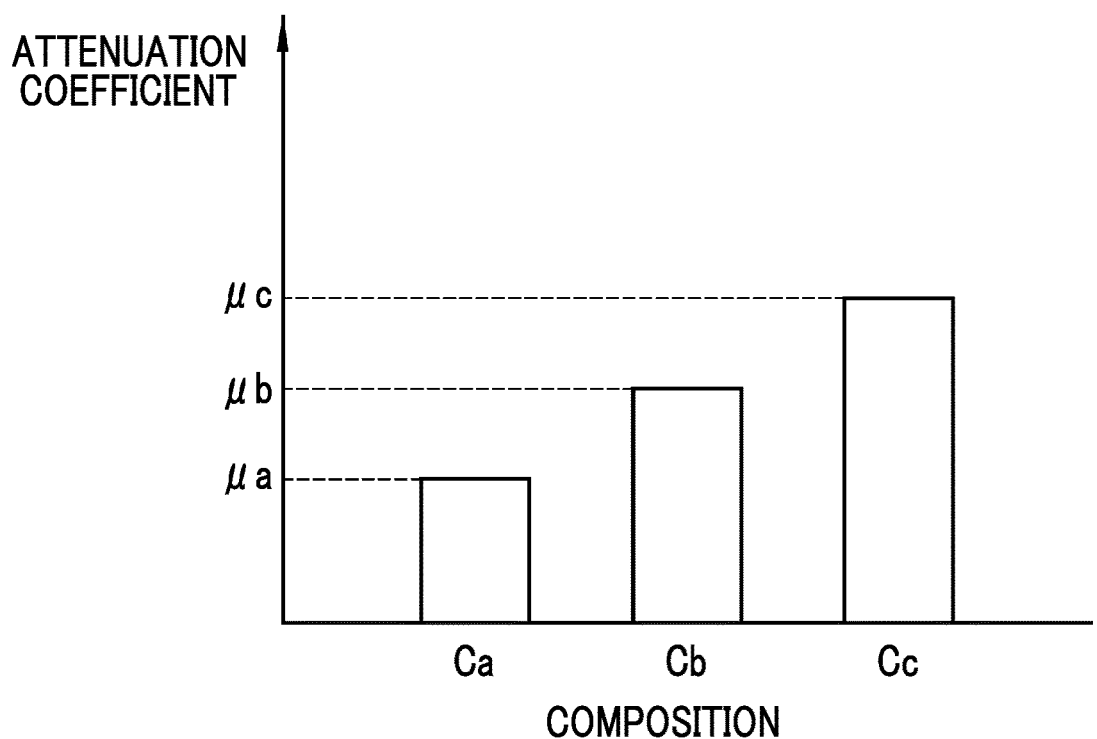
FIG. 4 is a graph showing the attenuation coefficient of each composition.

The attenuation coefficient calculation unit 35 calculates attenuation coefficients using ratios or differences between pixel values of corresponding pixels of two or more radiographic images. For example, as shown in FIG. 3, it is assumed that there are three types of structures of which the compositions are "Ca", "Cb", and "Cc" in the first radiographic image G1 and each of the pixel values of the structures in the first radiographic image G1 is V1. The pixel values of corresponding pixels in the second radiographic image G2 are "Va", "Vb", and "Vc", respectively. The degree of a reduction in the pixel value corresponds to the degree of the attenuation of radiation Ra that is caused by each structure (each composition). For this reason, as shown in FIG. 4, the attenuation coefficient calculation unit 35 can calculate the attenuation coefficient $\mu a$ of the structure having composition "Ca", the attenuation coefficient $\mu b$ of the structure having composition "Cb", and the attenuation coefficient $\mu c$ of the structure having composition "Cc" using ratios or differences between the pixel values of pixels of the first radiographic image G1 and the corresponding pixel values of the second radiographic image G2.

Since the attenuation coefficients $\mu$ can be calculated as described above in a case where the ratios or differences between the pixel values of pixels of the first radiographic image G1 and the pixel values of corresponding pixels of the second radiographic image G2 are known, the pixel values corresponding to the respective compositions "Ca", "Cb", and "Cc" are assumed as common "V1" in the first radiographic image G1 for simplicity. However, the pixel values corresponding to the respective compositions "Ca", "Cb", and "Cc" do not need to be common in the first radiographic image G1. Further, even in a case where there are four or more structures, the attenuation coefficient calculation unit 35 can calculate an attenuation coefficient $\mu$ for each structure (composition) in the same manner as described above.

The attenuation coefficient $\mu$ of each structure calculated by the attenuation coefficient calculation unit 35 is a relative value between the structures (particularly, the structures recognized by the structure recognition unit 34) included in the subject Obj. For this reason, the value of the attenuation coefficient $\mu$ calculated by the attenuation coefficient calculation unit 35 may be different from the value of a unique attenuation coefficient determined depending on a composition, but a difference between these values does not matter in the embodiment of the invention. Furthermore, a structure or the like (for example, a skin or the like), which substantially uniformly covers the entire subject Obj, also has a unique attenuation coefficient $\mu$, but the attenuation coefficient $\mu$ calculated by the attenuation coefficient calculation unit 35 is the attenuation coefficient $\mu$ of a structure with which a structure not recognized by the structure recognition unit 34 overlaps. Even in this regard, the value of the attenuation coefficient μ calculated by the attenuation coefficient calculation unit 35 may be different from the value of a unique attenuation coefficient determined depending on a composition, but a difference between these values does not matter in the embodiment of the invention likewise.

The image processing unit 36 performs one or a plurality of types of image processing on the radiographic images. The image processing unit 36 can perform image processing using the attenuation coefficients μ of the respective structures. The radiographic images, which are objects to be subjected to the image processing by the image processing unit 36, are at least one or a plurality of the radiographic images among the plurality of radiographic images that are acquired by the radiographic image acquisition unit 33. Further, in a case where the image processing unit 36 performs image processing, the image processing unit 36 can use the recognition results of the structure recognition unit 34 (information, such as the positions of the structures) as necessary.

In this embodiment, the image processing unit 36 generates an emphasized image Ge (see FIG. 11 and the like) in which one or a plurality of the structures among the plurality of structures recognized by the structure recognition unit 34 are emphasized. "Emphasis" for a structure included in the subject Obj means improving the visibility or identifiability of a specific structure with respect to other structures, and includes indirectly improving the visibility or the like of the specific structure by reducing the visibility or the like of other structures in addition to directly improving the visibility or the like of the specific structure. In order to generate the emphasized image Ge, the image processing unit 36 comprises, for example, a subtraction processing section 41, a contrast adjustment section 42, a hue adjustment section 43, and the like.

The subtraction processing section 41 generates so-called subtraction images using the attenuation coefficients μ. The subtraction images are emphasized images in which specific structures included in the subject Obj are emphasized, and are generated in a case where the subtraction processing of a radiographic image is performed by multiplying each pixel or each region where a recognized structure is present by the attenuation coefficient μ of the structure.

The contrast adjustment section 42 adjusts the contrast of the radiographic image acquired by the radiographic image acquisition unit 33 or the subtraction image by controlling a correspondence relationship between a pixel value and a display density (brightness at the time of display). An object of which the contrast is to be adjusted by the contrast adjustment section 42 is a part or all of the radiographic image or the subtraction image. For example, the contrast adjustment section 42 can change the contrast of each structure included in the subject Obj by adjusting the density (brightness) of the structure. That is, the image processing unit 36 can generate the emphasized image Ge in which the density of at least one structure is modulated by using the contrast adjustment section 42. The modulation of the density of the structure included in the subject Obj improves the visibility and/or identifiability of the structure or other structures distinguished from the structure.

The hue adjustment section 43 gives hues to the radiographic image acquired by the radiographic image acquisition unit 33 or the subtraction image as necessary. The radiographic image is originally a gray scale image, but the visibility of a structure and the identifiability of other structures are improved in a case where the hue adjustment section 43 adds colors. An object to which the hue adjustment section 43 adds a color is a part or all of the radiographic image or the subtraction image. For example, the hue adjustment section 43 can give different hues to the structures included in the subject Obj, respectively. That is, the image processing unit 36 can generate an emphasized image Ge in which the color or hue of at least one structure is modulated by using the hue adjustment section 43. The modulation of the color or hue of the structure included in the subject Obj improves the visibility and/or identifiability of the structure or other structures distinguished from the structure.

Figure 5:
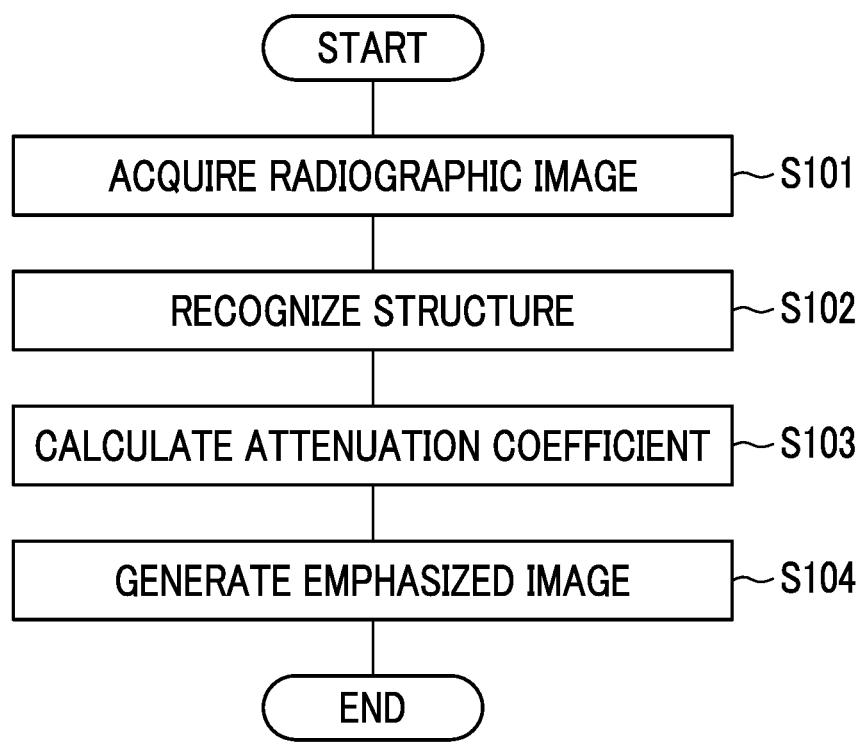
FIG. 5 is a flowchart showing the action of the radiographic image processing device.

The action of the radiographic image processing device 30 having the above-mentioned configuration will be described below. As shown in FIG. 5, the radiographic image acquisition unit 33 acquires a plurality of radiographic images of a specific subject Obj that are taken using radiation Ra having energies different from each other (Step S101). In this embodiment, the radiation source 13 emits constant radiation Ra and the subject Obj is imaged, but the subject Obj is imaged using the radiographic imaging panel 14 that includes the first and second radiation detectors 15 and 16 with the radiation energy conversion filter 17 interposed therebetween. For this reason, the energy of radiation Ra used to take the first radiographic image G1 using the first radiation detector 15 and the energy of radiation Ra used to take the second radiographic image G2 using the second radiation detector 16 are substantially changed. For this reason, the radiographic image acquisition unit 33 acquires the first and second radiographic images G1 and G2 of the specific subject Obj.

Figure 6:
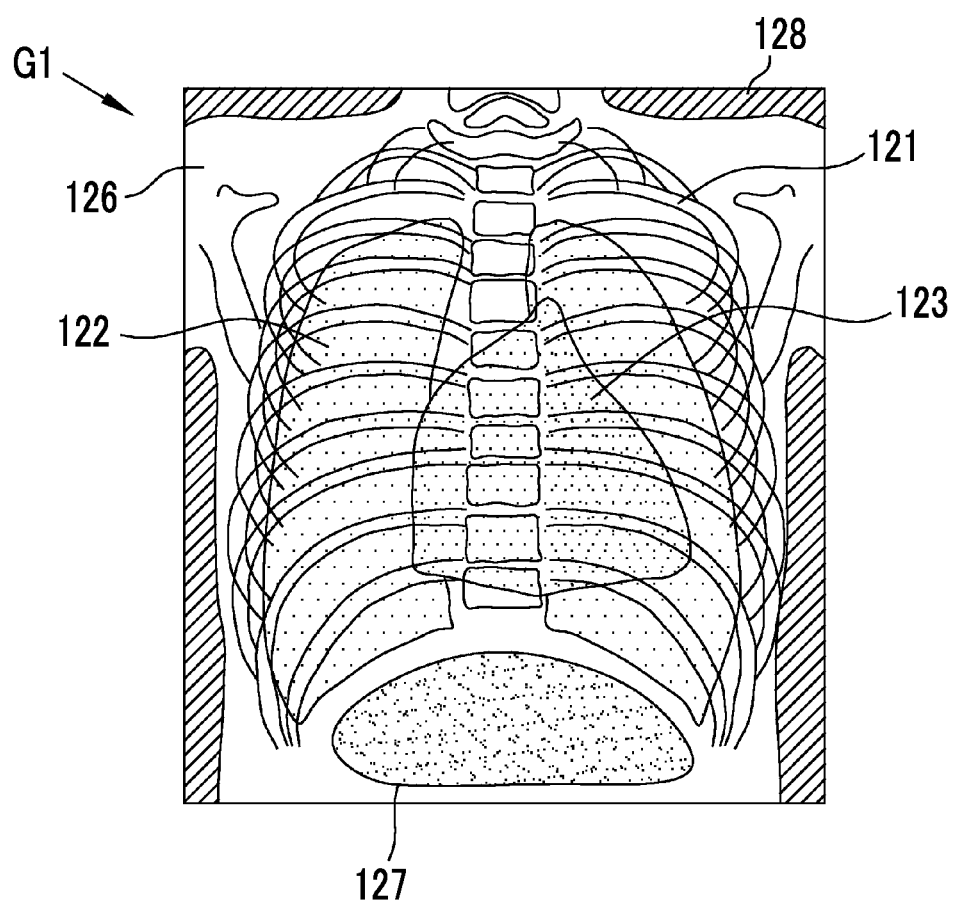
FIG. 6 is a schematic diagram of a first radiographic image.

Further, in this embodiment, the subject Obj is a human and the chest of the human is a main imaged part. For this reason, a bony part 121, such as the ribs, the lungs 122, the heart 123, muscle 126 of the shoulders, upper arms, or the like, the fat 127, and the like appear in the first radiographic image G1 as shown in FIG. 6. Furthermore, the chest, the respective tissues near the chest, and the like appear so as to overlap. That is, there is a case where some or all of the images (shades) of these tissues and the like overlap with the images of other tissues and the like. A so-called directly exposed region 128 is also present in the first radiographic image G1. The directly exposed region 128 is a region where the radiation Ra directly reaches the radiographic imaging panel 14 without being transmitted through the subject Obj.

Figure 7:
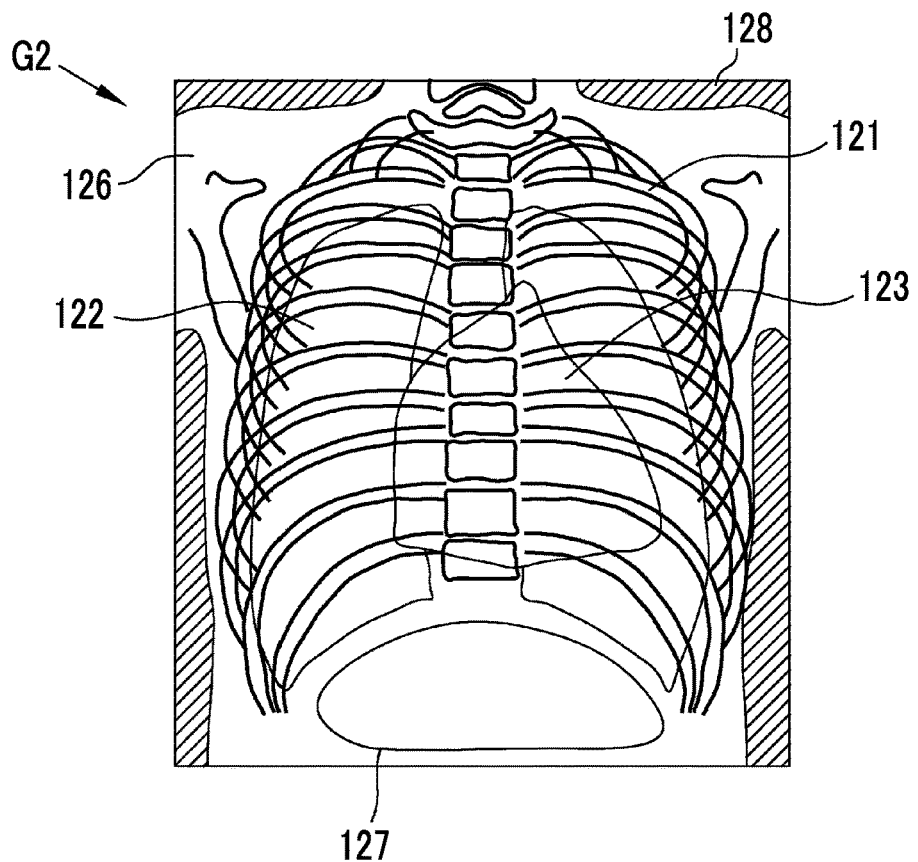
FIG. 7 is a schematic diagram of a second radiographic image.

As shown in FIG. 7, the images of these tissues and the like appear even in the second radiographic image G2. However, the energy of radiation Ra used to take the first radiographic image G1 and the energy of radiation Ra used to take the second radiographic image G2 are substantially different from each other. Accordingly, in a case where the images of the respective tissues of the first radiographic image G1 are compared with the images of the respective tissues of the second radiographic image G2, the magnitudes of the pixel values of the respective tissues of corresponding portions are also different from each other. As a result, the first and second radiographic images G1 and G2 are different from each other in the relative brightness and/or contrast, and the like of the respective tissues.

Figure 8:
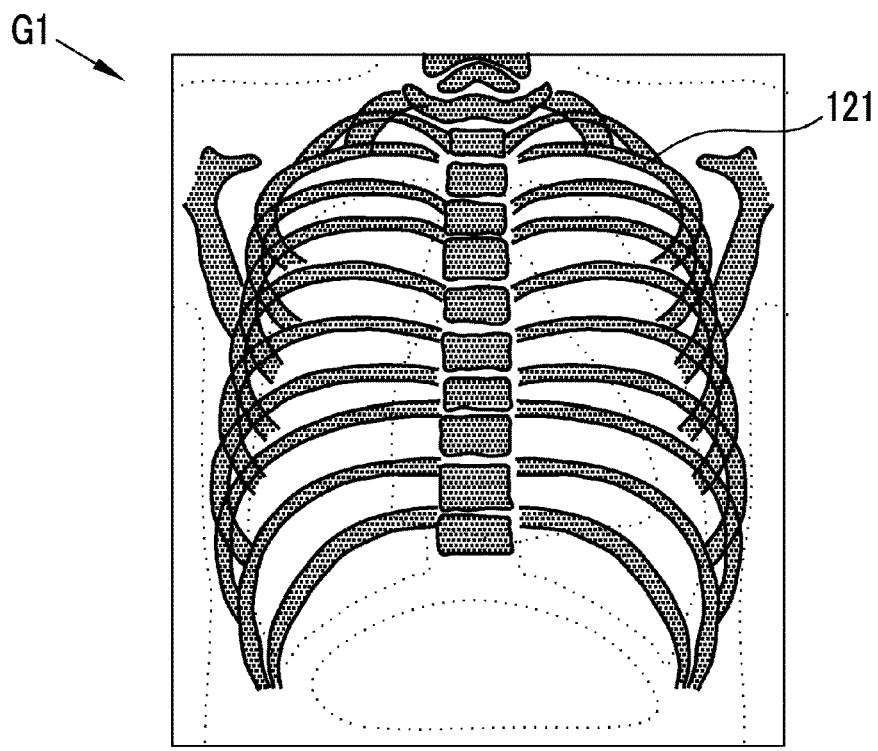
FIG. 8 is a schematic diagram of a bony part that is recognized by a structure recognition unit.
Figure 9:
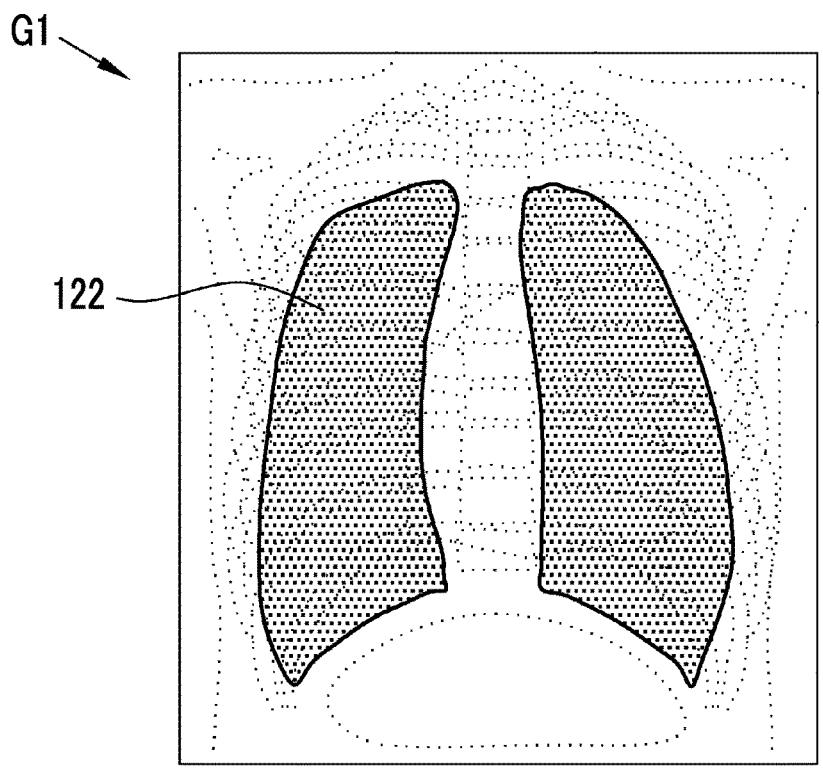
FIG. 9 is a schematic diagram of the lungs that are recognized by the structure recognition unit.
Figure 10:
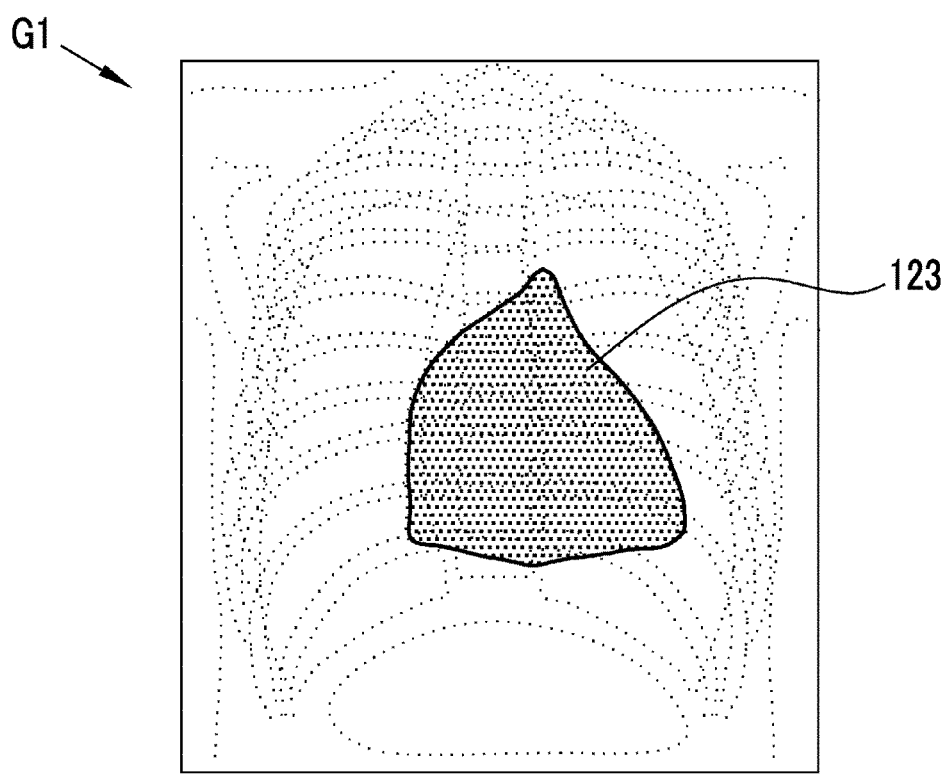
FIG. 10 is a schematic diagram of a heart that is recognized by the structure recognition unit.

In a case where the radiographic image acquisition unit 33 acquires the first and second radiographic images G1 and G2 of the specific subject Obj, the structure recognition unit 34 recognizes structures, which are included in the subject Obj captured in these radiographic images, using the first radiographic image G1 and/or the second radiographic image G2 (Step S102). In this embodiment, the structure recognition unit 34 specifies the positions, sizes, shapes, and/or the like of the respective tissues included in the subject Obj, that is, the bony part 121, the lungs 122, the heart 123, the muscle 126 of the shoulders, upper arms, or the like, the fat 127, and the like as structures included in the subject Obj. For example, as shown in FIG. 8, the structure recognition unit 34 distinguishes the bony part 121 from soft part tissues, such as the lungs 122, and specifies the bony part 121 in the first radiographic image G1. Likewise, as shown in FIG. 9, the structure recognition unit 34 distinguishes the lungs 122 from other soft part tissues, such as the heart 123, and the bony part 121 and specifies the lungs 122 in the first radiographic image G1. Further, as shown in FIG. 10, the structure recognition unit 34 distinguishes the heart 123 from other soft part tissues, such as the lungs 122, and the bony part 121 and specifies the heart 123 in the first radiographic image G1. The same applies to the muscle 126, the fat 127, and the like.

In a case where the structure recognition unit 34 recognizes the structures of the subject Obj, the attenuation coefficient calculation unit 35 calculates the attenuation coefficients $\mu$ of the respective structures using the recognition results of the structure recognition unit 34 and the first and second radiographic images G1 and G2 (Step S103). Specifically, the attenuation coefficient calculation unit 35 calculates ratios or differences between pixel values of pixels of the first radiographic image G1 and pixel values of corresponding pixels of the second radiographic image G2. Further, the attenuation coefficient calculation unit 35 obtains the relative attenuation coefficients $\mu$ of the respective structures from the ratios or differences between the pixel values in consideration of the overlap and the like of the respective structures using the positions, sizes, shapes, and/or the like of the respective structures that are the recognition results of the structure recognition unit 34.

Figure 11:
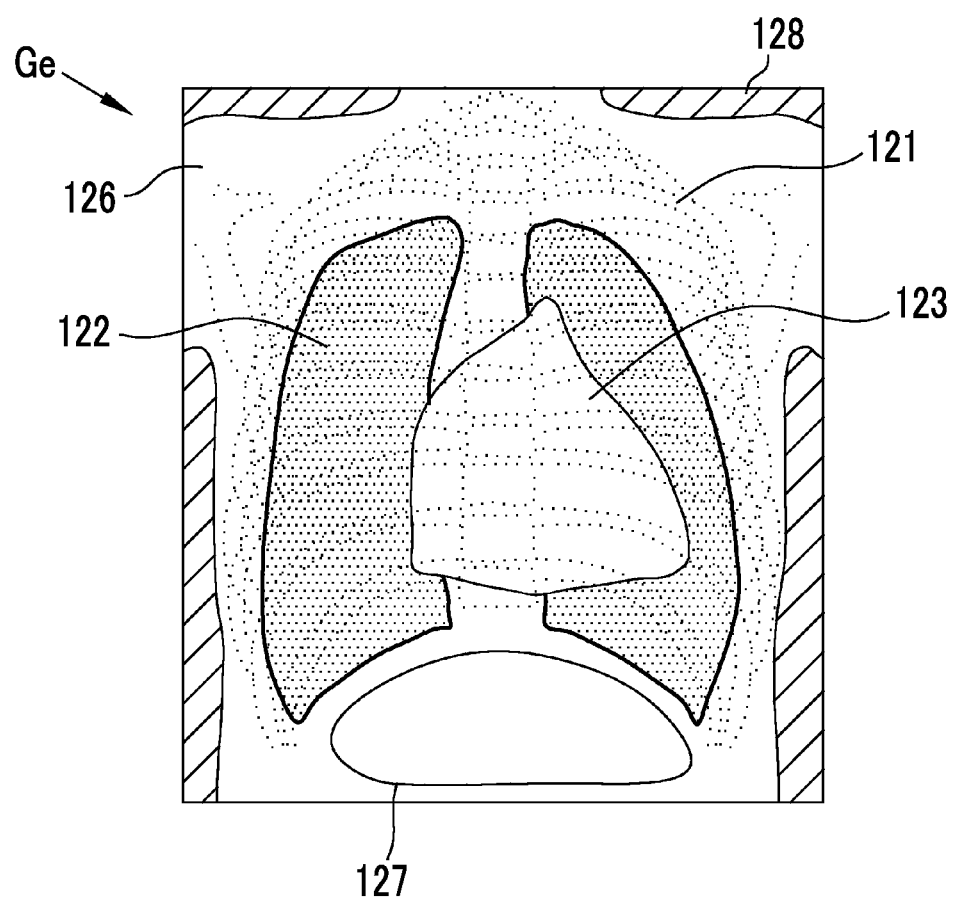
FIG. 11 is a schematic diagram of an emphasized image in which the lungs are emphasized.

In a case where the attenuation coefficient calculation unit 35 calculates the attenuation coefficients $\mu$ of the respective structures, the image processing unit 36 generates an emphasized image Ge by performing the subtraction processing on the first and second radiographic images G1 and G2 using the attenuation coefficients $\mu$ of the respective structures (Step S104). The image processing unit 36 generates an emphasized image Ge in which, for example, portions showing the lungs 122 are emphasized as shown in FIG. 11. The display unit 31 displays the emphasized image Ge generated by the image processing unit 36, so that the emphasized image Ge is provided to a doctor or the like. Accordingly, the doctor or the like can make a diagnosis and the like using the emphasized image Ge.

As described above, the radiographic image processing device 30 individually specifies the structures, which are included in the subject Obj, in the radiographic image by recognizing the structures of the subject Obj. Moreover, the radiographic image processing device 30 calculates the attenuation coefficients $\mu$ of the respective structures, performs image processing using the attenuation coefficients $\mu$, and provides the results of the image processing to a doctor or the like. Accordingly, the doctor or the like can individually, accurately, and easily specify the structures, which are included in the subject Obj, in the radiographic image on the basis of the results of the image processing of the radiographic image processing device 30. Therefore, the radiographic image processing device 30 can support a diagnosis, which is made by the doctor or the like, and the like.

Specifically, the radiographic image processing device 30 generates the emphasized image Ge in which structures are emphasized, and provides this emphasized image Ge to a doctor or the like. Accordingly, the doctor or the like can visually clearly grasp the structures, which are included in the subject Obj, in the emphasized image Ge. As a result, the doctor or the like can accurately and efficiently make a diagnosis and the like.

In addition, the radiographic image processing device 30 relatively recognizes the structures, which are included in the subject Obj, in the radiographic image by the structure recognition unit 34. For this reason, even though structures as an object to be recognized are not determined in advance, the radiographic image processing device 30 can recognize any structure (unknown and/or undetermined structure) in a range where the structure recognition unit 34 can distinguish a structure from other tissues and the radiographic image processing device 30 can put an emphasis or the like on this structure. Accordingly, it is possible to accurately specify structures, which are included in the subject Obj, without easily being affected by the individual difference of the subject Obj. Further, it is also possible to specify the positions and the like of the structures (for example, lesions, portions suspected as lesions, or the like) unique to the subject Obj, artifacts embedded in the subject Obj, or the like, and to put an emphasis or the like on the structures, the artifacts, or the like.

Furthermore, the radiographic image processing device 30 calculates the relative attenuation coefficient $\mu$ of each of the structures, which are included in the subject Obj, by the attenuation coefficient calculation unit 35. For this reason, the attenuation coefficients $\mu$ unique to the respective structures included in the subject Obj do not need to be determined in advance by experiments and the like in the radiographic image processing device 30 unlike in a radiographic imaging device and the like that perform subtraction processing in the related art; and the radiographic image processing device 30 can also calculate the attenuation coefficients $\mu$ of unknown and undetermined structures, particularly, structures (for example, lesions, portions suspected as lesions, or the like) substantially unique to the subject Obj, artifacts embedded in the subject Obj, or the like. As a result, the radiographic image processing device 30 can individually put an emphasis or the like on unknown and undetermined structures by subtraction processing and the like without being substantially affected by the individual difference of the subject Obj and can provide information about the presence/absence, positions, and the like of the structures.

As in the first embodiment, the structure recognition unit 34 can recognize three or more structures using two radiographic images and the attenuation coefficient calculation unit 35 can calculate the attenuation coefficients $\mu$ of the three or more structures, which are recognized by the structure recognition unit, using the two radiographic images that are used in the recognition processing by the structure recognition unit 34. That is, the radiographic image processing device 30 can obtain the attenuation coefficients $\mu$ of three or more structures from at least two radiographic images, and can put an emphasis or the like on these three or more structures. Objects to be recognized by the structure recognition unit 34 are random, and the reason for this is that the calculation of an attenuation coefficient $\mu$ performed by the attenuation coefficient calculation unit 35 is the calculation of a relative attenuation coefficient $\mu$ between structures. For example, a bony part image and a soft part image can be obtained from two radiographic images in a radiographic imaging device and the like performing subtraction processing in the related art. However, according to the radiographic image processing device 30, a soft part can be more strictly distinguished and an emphasized image Ge for each of the compositions of soft part tissues, such as the emphasized image Ge of the lungs 122 and/or the emphasized image Ge of the heart 123, can be obtained.

Figure 12:
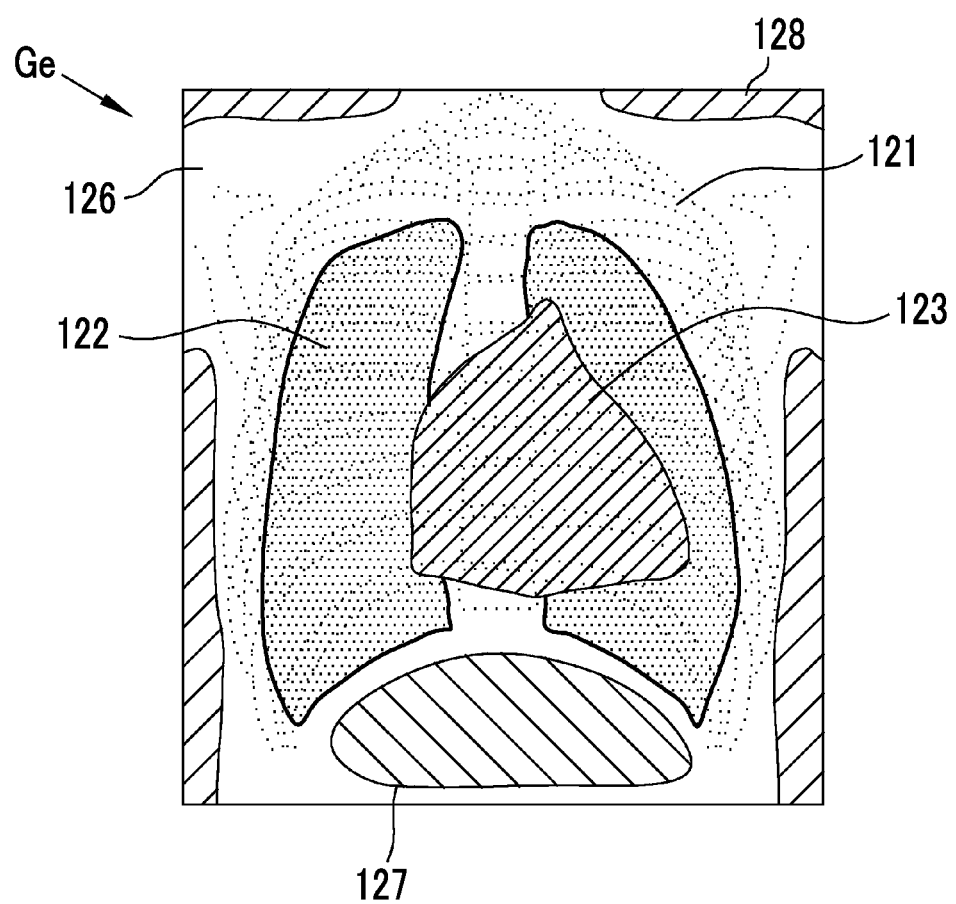
FIG. 12 is a schematic diagram of an emphasized image in which colors or brightness is modulated to emphasize the respective structures.

The image processing unit 36 generates an emphasized image Ge in which the lungs 122 as one of structures recognized by the structure recognition unit 34 are emphasized in the first embodiment, but can generate an emphasized image in which a plurality of structures recognized by the structure recognition unit 34 are emphasized. For example, the image processing unit 36 can generate an emphasized image Ge in which the heart 123 and the fat 127 are emphasized in addition to the lungs 122 on the basis of settings or the like as shown in FIG. 12. Further, in a case where a plurality of structures are emphasized, the structures can be emphasized in respective different manners. For example, different hues can be given to the structures, respectively. In a case where the structures are emphasized in respective different manners in this way, the identifiability of the emphasized respective structures can be maintained while the respective structures are emphasized.

Second Embodiment

Figure 13:
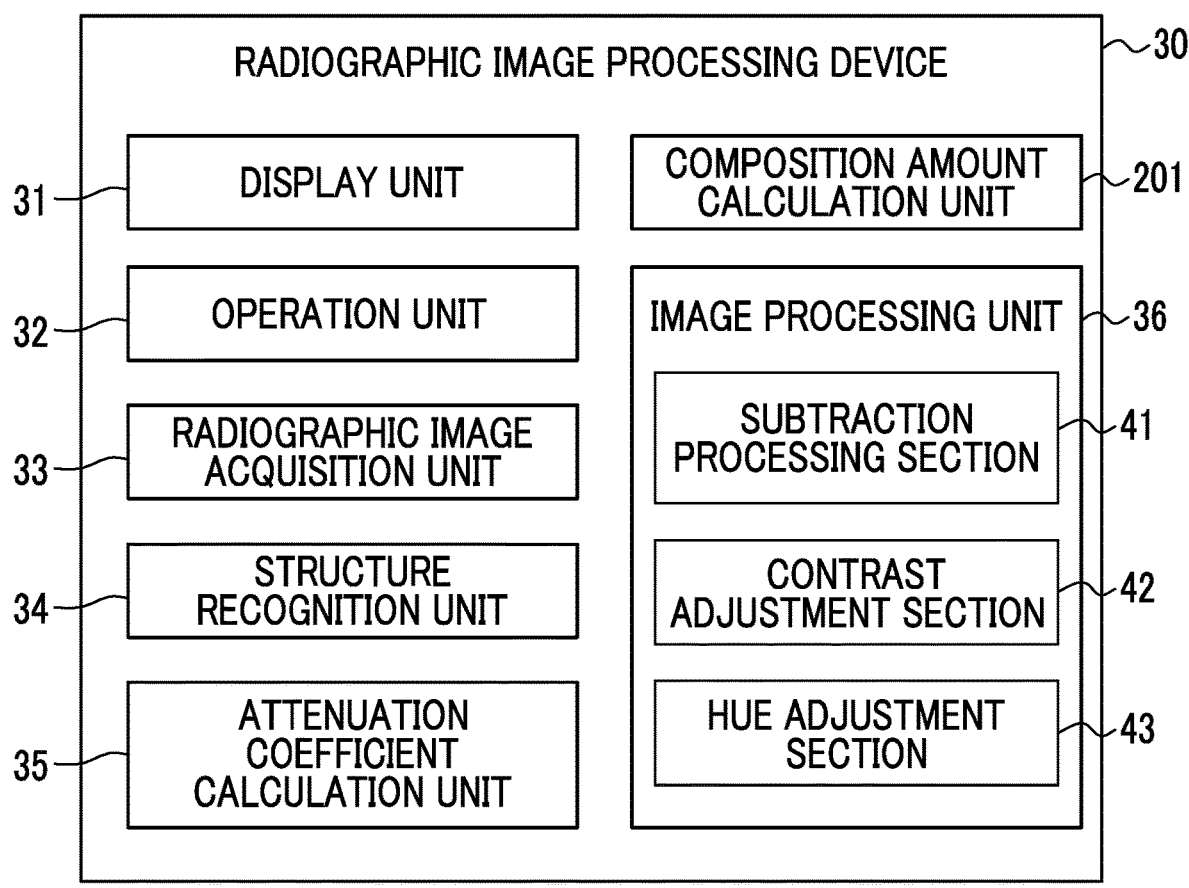
FIG. 13 is a block diagram of a radiographic image processing device according to a second embodiment.

An emphasized image Ge in which each structure recognized by the structure recognition unit 34 is emphasized by the subtraction processing and the like is generated in the first embodiment, but a composition amount image Gc (see FIG. 14) showing the amount of composition of each structure can be generated. In this case, the radiographic image processing device 30 is provided with a composition amount calculation unit 201 as shown in FIG. 13. The composition amount calculation unit 201 calculates the amount of composition of each structure using the recognition results of the structure recognition unit 34 (the positions and the like of structures) and the attenuation coefficients μ calculated by the attenuation coefficient calculation unit 35. "The amount of composition" is the mass of a portion, through which radiation Ra is transmitted, of each structure (substantially, the thickness of the structure).

For example, in a case where the pixel values of corresponding pixels of the first and second radiographic images G1 and G2 are compared with each other, ratios or differences between the pixel values vary depending on the amounts of compositions of the structures. For this reason, in a case where the attenuation coefficients μ of the respective structures are calculated by the attenuation coefficient calculation unit 35 and are already known, the attenuation coefficient calculation unit 35 can calculate the amount of composition of the structure at a specific position (for example, each pixel) of each structure back from the ratios or differences between the pixel values of corresponding pixels of the first and second radiographic images G1 and G2. However, the amount of composition calculated by the composition amount calculation unit 201 is a relative value in a specific structure.

Figure 14:
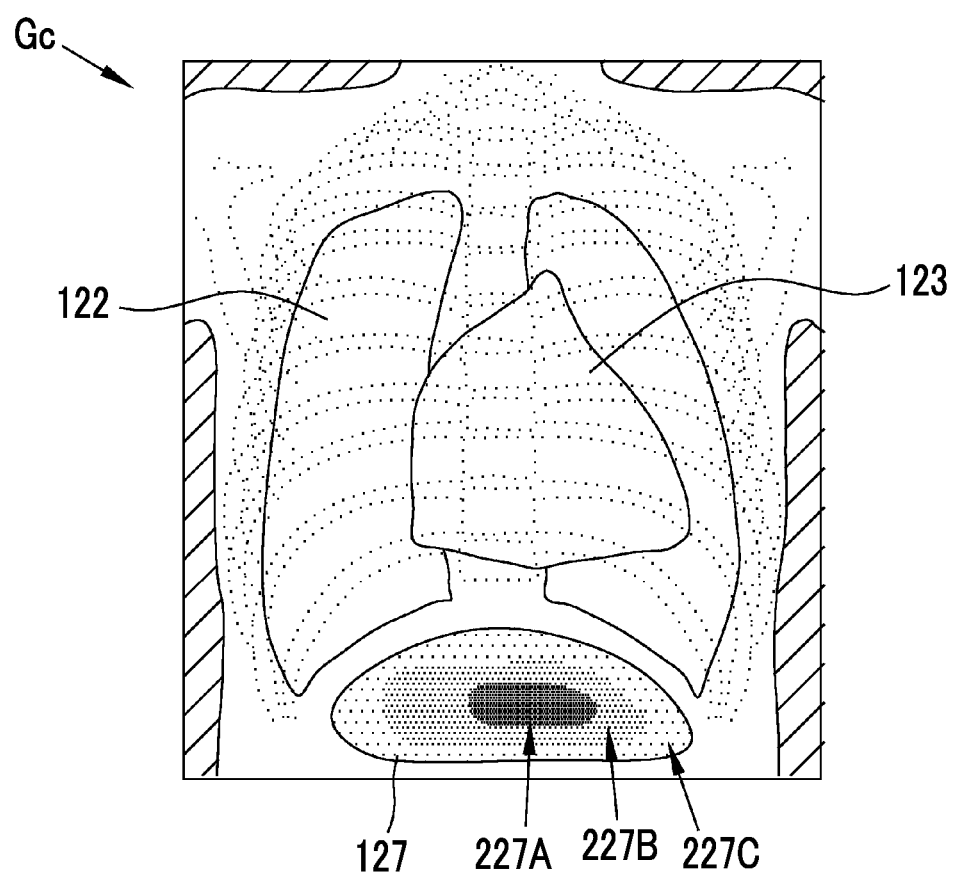
FIG. 14 is a schematic diagram of a composition amount image.

In a case where the composition amount calculation unit 201 is provided as described above, the image processing unit 36 can use the amount of composition, which is calculated by the composition amount calculation unit 201, to generate a composition amount image Gc, which has a color or density corresponding to the amount of composition of each structure (contrast with respect to other structures or the like), in a case where each structure is to be emphasized. "A color or density corresponding to the amount of composition" means a color or density determined depending on the amount of composition and is, for example, a color or density (contrast) proportional to the amount of composition. As shown in FIG. 14, the composition amount image Gc is, for example, an image in which colors or densities corresponding to the amounts of compositions are further given to portions showing the fat 127 in the emphasized image Ge in which the fat 127 is emphasized by subtraction processing and the like. In FIG. 14, a central portion 227A, an intermediate portion 227B, and an outer peripheral portion 227C of the fat 127 have different densities, respectively.

In a case where the composition amount image Gc is generated and provided as described above, a doctor or the like not only can specify structures included in the subject but also can grasp the amounts of compositions thereof at the same time. For this reason, it is easy to use the composition amount image Gc for a diagnosis and the like.

Figure 15:
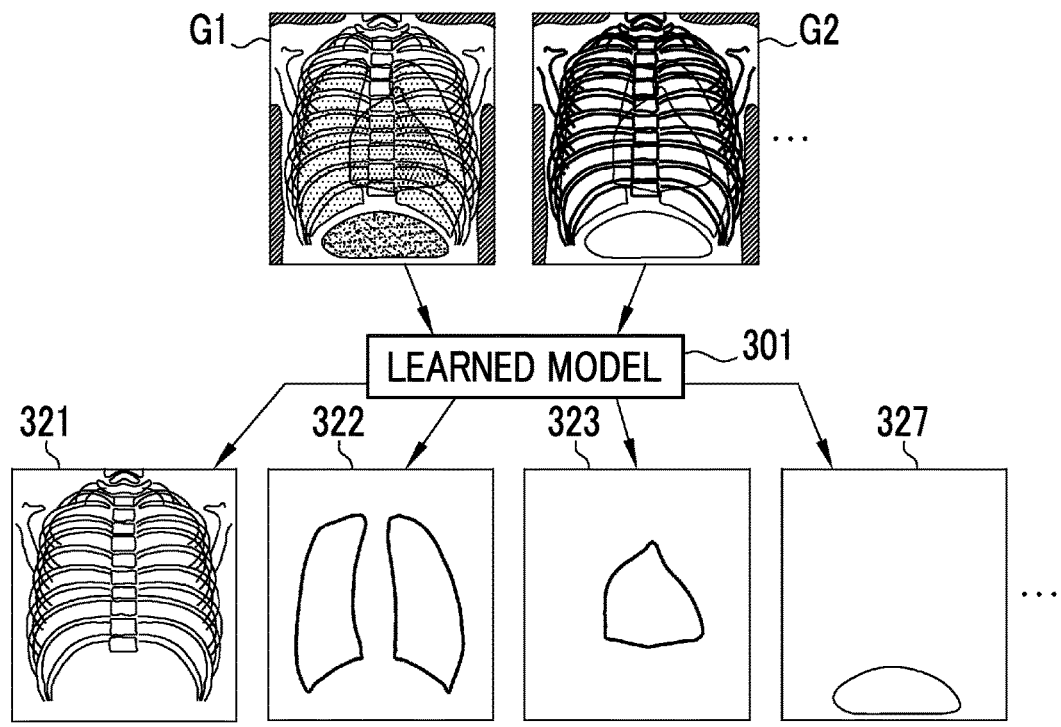
FIG. 15 is a learned model that specifies structures.

In the first embodiment, the second embodiment, and modification examples thereof, the structure recognition unit 34 can be formed using a so-called learned artificial intelligence (AI) program (hereinafter, referred to as a learned model). For example, as shown in FIG. 15, a learned model 301 specifies one or a plurality of structures, which are included in a specific subject Obj, in a plurality of radiographic images by the input of the plurality of radiographic images that are taken from the subject Obj using radiations having energies different from each other. That is, the learned model 301 receives the input of a plurality of radiographic images of the specific subject Obj that are taken using radiation Ra having energies different from each other, such as the first and second radiographic images G1 and G2. Then, the learned model 301 recognizes one or a plurality of structures included in the subject Obj, in these radiographic images, and outputs, for example, information 321 about a position and the like that is recognition results related to the position, size, shape, and the like of the bony part 121, information 322 about a position and the like of the lungs 122, information 323 about a position and the like of the heart 123, information 327 about a position and the like of the fat 127, and the like. The learned model 301 can learn using a publicly known learning method, such as deep learning.

In a case where the structure recognition unit 34 is formed using the learned model 301, the structure recognition unit 34 is a program that recognizes the structures included in the subject Obj using the learned model 301.

Figure 16:
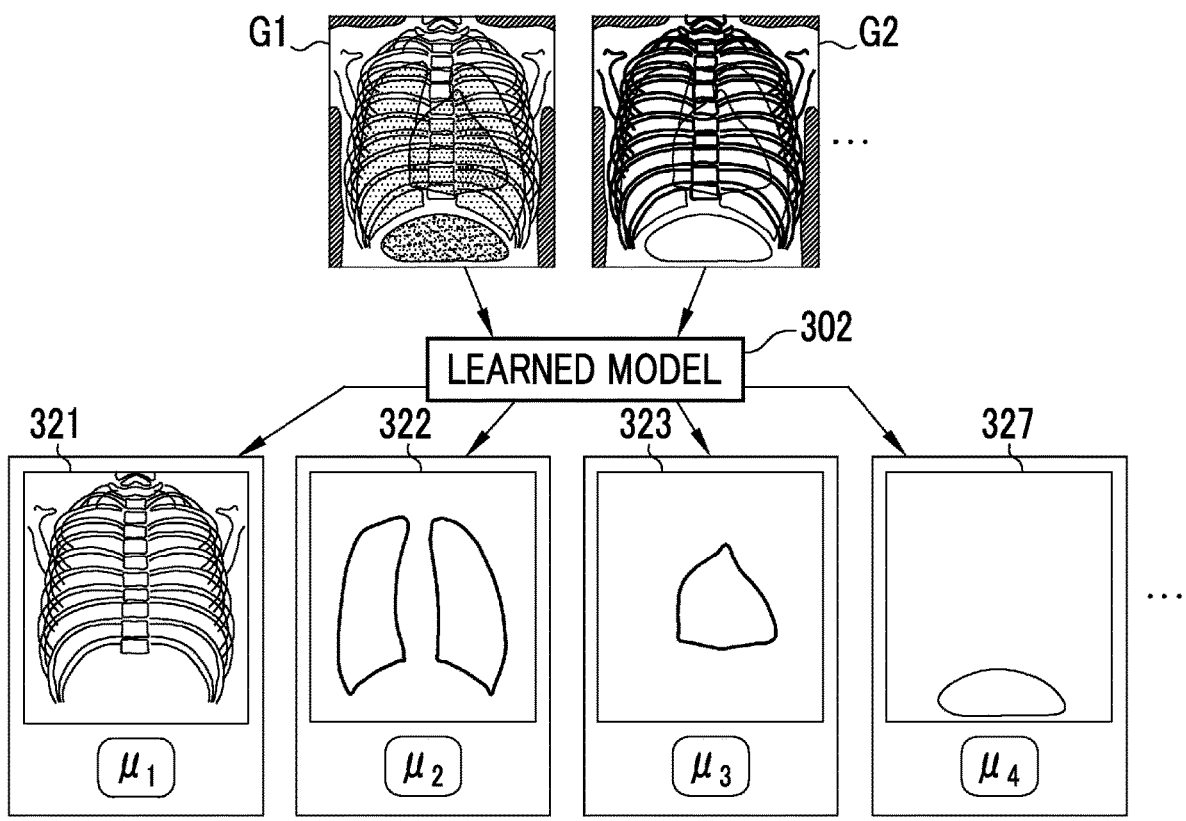
FIG. 16 is a learned model that specifies structures and attenuation coefficients thereof.

Further, in the first embodiment, the second embodiment, and modification examples thereof, the structure recognition unit 34 and the attenuation coefficient calculation unit 35 can be formed using a learned model. For example, as shown in FIG. 16, a learned model 302 specifies one or a plurality of structures, which are included in a specific subject Obj, and attenuation coefficients μ of the structures in a plurality of radiographic images by the input of the plurality of radiographic images that are taken from the subject Obj using radiation Ra having energies different from each other. That is, the learned model 302 receives the input of a plurality of radiographic images of the specific subject Obj that are taken using radiation Ra having energies different from each other, such as the first and second radiographic images G1 and G2. Then, the learned model 302 outputs structure-specifying information that includes the positions and the like of one or a plurality of structures included in the subject Obj in these radiographic images and the attenuation coefficients μ of the respective structures. For example, the learned model 302 outputs information 321 about a position and the like of the bony part 121 and an attenuation coefficient μ1 of the bony part 121, information 322 about a position and the like of the lungs 122 and an attenuation coefficient μ2 of the lungs 122, information 323 about a position and the like of the heart 123 and an attenuation coefficient μ3 of the heart 123, and information 327 about a position and the like of the fat 127 and an attenuation coefficient μ4 of the fat 127, and the like. The learned model 302 can learn using a publicly known learning method, such as deep learning.

In a case where the structure recognition unit 34 and the attenuation coefficient calculation unit 35 are formed using the learned model 302, the structure recognition unit 34 and the attenuation coefficient calculation unit 35 are a program that classifies the structures included in the subject Obj using the learned model 302.

In the embodiments and the like, the hardware structures of processing units, which perform various types of processing, such as the radiographic image acquisition unit 33, the structure recognition unit 34, the attenuation coefficient calculation unit 35, the image processing unit 36, the respective sections of the image processing unit 36, and the composition amount calculation unit 201, are various processors to be described later. Various processors include: a central processing unit (CPU) that is a general-purpose processor functioning as various processing units by executing software (programs); a graphical processing unit (GPU); a programmable logic device (PLD) that is a processor of which the circuit configuration can be changed after manufacture, such as a field programmable gate array (FPGA); a dedicated electrical circuit that is a processor having circuit configuration designed exclusively to perform various types of processing; and the like.

One processing unit may be formed of one of these various processors, or may be formed of a combination of two or more same kind or different kinds of processors (for example, a combination of a plurality of FPGAs, a combination of a CPU and an FPGA, a combination of a CPU and a GPU, or the like). Further, a plurality of processing units may be formed of one processor. As an example where a plurality of processing units are formed of one processor, first, there is an aspect where one processor is formed of a combination of one or more CPUs and software as typified by a computer, such as a client or a server, and functions as a plurality of processing units. Second, there is an aspect where a processor implementing the functions of the entire system, which includes a plurality of processing units, by one integrated circuit (IC) chip is used as typified by System On Chip (SoC) or the like. In this way, various processing units are formed using one or more of the above-mentioned various processors as hardware structures.

In addition, the hardware structures of these various processors are more specifically electrical circuitry where circuit elements, such as semiconductor elements, are combined.

EXPLANATION OF REFERENCES

10: radiographic imaging system
13: radiation source
14: radiographic imaging panel
15: first radiation detector
16: second radiation detector
17: radiation energy conversion filter
20: console
21: display unit
22: operation unit
30: radiographic image processing device
31: display unit
32: operation unit
33: radiographic image acquisition unit
34: structure recognition unit
35: attenuation coefficient calculation unit
36: image processing unit
41: subtraction processing section
42: contrast adjustment section
43: hue adjustment section
121: bony part
122: lung
123: heart
126: muscle
127: fat
128: directly exposed region
201: composition amount calculation unit
227A: central portion
227B: intermediate portion
227C: outer peripheral portion
301: learned model
302: learned model
321, 322, 323, 327: information about position and the like
G1: first radiographic image
G2: second radiographic image
Gc: composition amount image
Ge: emphasized image
Obj: subject
Ra: radiation
S101 to S104: operation step

What is claimed is:

1. A radiographic image processing device comprising:
a processor configured to function as:
a radiographic image acquisition unit that acquires a plurality of radiographic images of a specific subject taken using radiations having energies different from each other;
a structure recognition unit that is formed using a learned artificial intelligence program and configured to recognize a plurality of structures, which is included in the subject, using one or a plurality of the radiographic images, the structure recognition unit specifies portions in the subject that can be relatively distinguished based on position, size, or shape as the plurality of structures;
an attenuation coefficient calculation unit that, for each of the plurality of structures specified by the structure recognition unit, calculates an attenuation coefficient of the radiation using a ratio or difference between pixel values of corresponding pixels of the plurality of radiographic images, wherein the attenuation coefficient of each structure calculated by the attenuation coefficient calculation unit is a relative value between the plurality of structures specified by the structure recognition unit; and
a subtraction processing unit that, based on the radiographic images, generates a subtraction image by applying the attenuation coefficient calculated by the attenuation coefficient calculation unit to each region in which one of the structures specified by the structure recognition unit is present, wherein in the subtraction image one or more of the plurality of structures specified by the structure recognition unit is emphasized.

2. The radiographic image processing device according to claim 1,
wherein the attenuation coefficient calculation unit calculates the attenuation coefficients using ratios or differences between pixel values of corresponding pixels of two or more radiographic images.

3. The radiographic image processing device according to claim 1,
wherein the structure recognition unit recognizes three or more structures using two radiographic images, and
the attenuation coefficient calculation unit calculates the attenuation coefficients of the three or more structures, which are recognized by the structure recognition unit, using the two radiographic images that are used in recognition processing by the structure recognition unit.

4. The radiographic image processing device according to claim 1, further comprising:
a composition amount calculation unit that calculates an amount of composition of each of the structures using the recognition results of the structure recognition unit and the attenuation coefficients.

5. The radiographic image processing device according to claim 1,
wherein an image processing unit generates an emphasized image in which one or a plurality of the structures among the plurality of structures recognized by the structure recognition unit are emphasized.

6. The radiographic image processing device according to claim 5,
wherein the image processing unit generates the emphasized image by subtraction processing.

7. The radiographic image processing device according to claim 5,
wherein the image processing unit generates the emphasized image in which a color or density of at least one of the structures is modulated.

8. The radiographic image processing device according to claim 4,
wherein an image processing unit generates a composition amount image that has a color or density corresponding to the amount of composition of the structure.

9. The radiographic image processing device according to claim 1,
wherein the structures are soft tissues, bones, lesions, portions with a possibility of lesions, or artifacts.

10. The radiographic image processing device according to claim 9,
wherein the soft tissues are at least one of heart, lungs, fat, and muscles.

11. The radiographic image processing device according to claim 1,
wherein the radiographic image acquisition unit acquires radiographic images subjected to scattered radiation correction processing.

12. The radiographic image processing device according to claim 1,
wherein the processor is further configured to function as:
an image processing unit that performs image processing on one or a plurality of the radiographic images among the plurality of radiographic images using the attenuation coefficients.

13. The radiographic image processing device according to claim 1, further comprising:
a display unit that displays the radiographic images or images generated by the image processing unit.

14. The radiographic image processing device according to claim 13,
wherein the processor is further configured to function as:
a subtraction processing section that generates subtraction images using the attenuation coefficients based on the radiographic images; and
a contrast adjustment section that adjusts the contrast by controlling correspondence between pixel values and display density when displaying the subtraction images on the display unit.

* * * * *